Feb. 28, 1939.  H. KATTWINKEL  2,148,818
VEHICLE BRAKE
Filed April 4, 1936   3 Sheets-Sheet 3
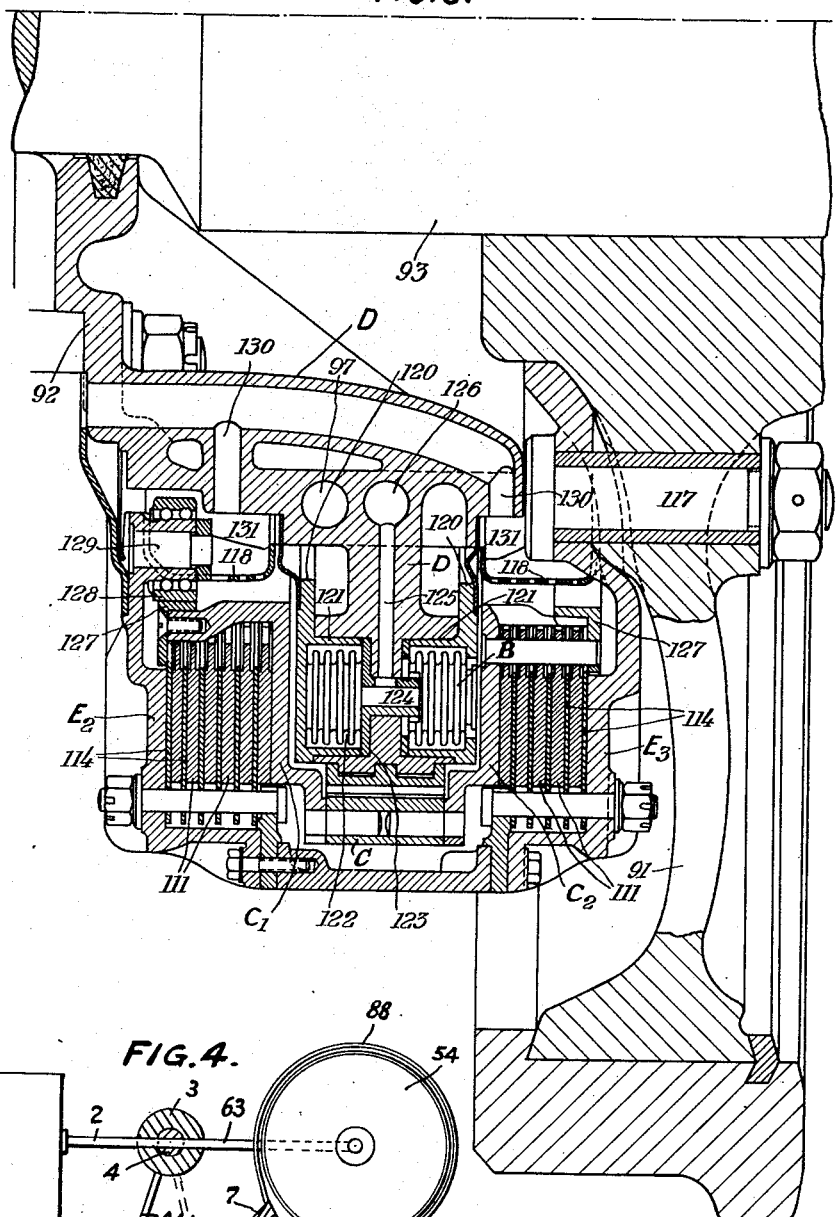
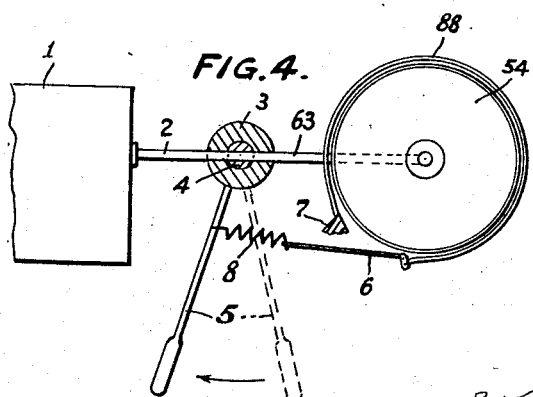
Inventor:
H. Kattwinkel
By: Glascock Downing & Seebold
Attys.

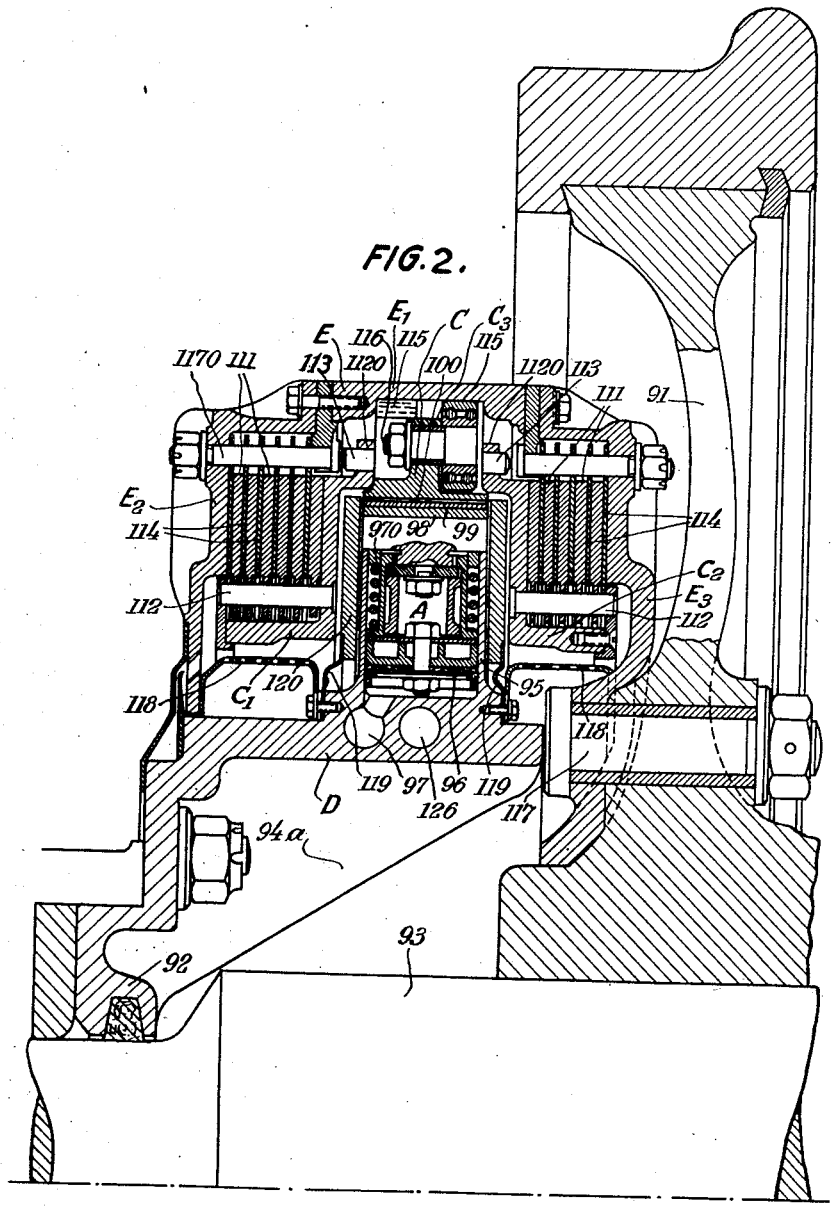

Patented Feb. 28, 1939

2,148,818

UNITED STATES PATENT OFFICE 2,148,818

VEHICLE BRAKE

Hans Kattwinkel, Coswig, Germany

Application April 4, 1936, Serial No. 72,809
In Germany April 5, 1935

28 Claims. (Cl. 188—72)

My invention relates to multiple disc brakes principally adapted for railway-vehicles but also suitable for other purposes, such as for instance for heavy and rapid motor-cars.

In the ordinary multiple disc brakes the one group of discs rotates with the axle to be braked, whereas the other group of discs is fast, and the braking operation is effected in such a way that all the discs belonging alternately to the one or the other group are pressed together in an axial direction, so that a high friction is effected between the fast and the rotating discs which friction consumes the energy of the machine to be braked which is in this way brought to a standstill.

In the case that the said ordinary multiple disc brakes have to be used for the consumption of great quantities of energy such as in the case of very rapid railway vehicles or heavy motor trucks, there exists the drawback that the multiple disc brakes must on account of the necessary great number of discs be of a great axial length which renders such brakes unfit for many purposes and especially unfit for railway vehicles. The axial length does not depend only upon the totality of the co-operating discs of the one and the other group of discs but also depends considerably upon the intervening spaces between the rotating and fast discs. The said intervening spaces must be relatively large because the discs cannot practically be made completely plane, and on account of deformations due to the influence of heat such discs cannot anyhow be kept in a plane condition, so that in the case of too small intervening spaces there will always be a slipping between the discs while the brake is not applied. Especially after considerable deformations of the discs due to a preceding consumption of large quantities of energy much power is constantly lost by the said slipping between the discs. In the known multiple disc brakes the axial length can only be reduced by decreasing the number of the discs and correspondingly increasing the friction pressure. But with the increased friction pressure other drawbacks are connected such as a higher specific stress, overheating in connection with a burning of the impregnating substance of the friction lining, difficult transmission or dissipation of the heat, seizing of the friction surfaces, short life of the friction linings and so forth.

According to my invention all these difficulties are avoided in the simple manner that in combination with a very close adjacency of the discs the group of discs which is not directly or permanently connected to the axle or the like to be braked is in the neutral position of the brake allowed to rotate with the axle, so that in the said neutral position of the brake losses due to friction are avoided and generation of injurious heat in the discs can no more occur, whereas the discs being not in direct or permanent connection with the axle are only held fast immediately before the brake is applied and the discs have for this purpose been forcibly pressed together, the said holding fast of the one group of discs being preferably effected by braking the carrier of these discs before the pressing together of the totality of discs.

In the accompanying drawings:

Fig. 2 is an axial section through a modification,

Fig. 3 is an axial section through a further modification,

Fig. 4 is a diagrammatic view showing the brake connected up to a container for supplying pressure fluid thereto.

Figure 1:
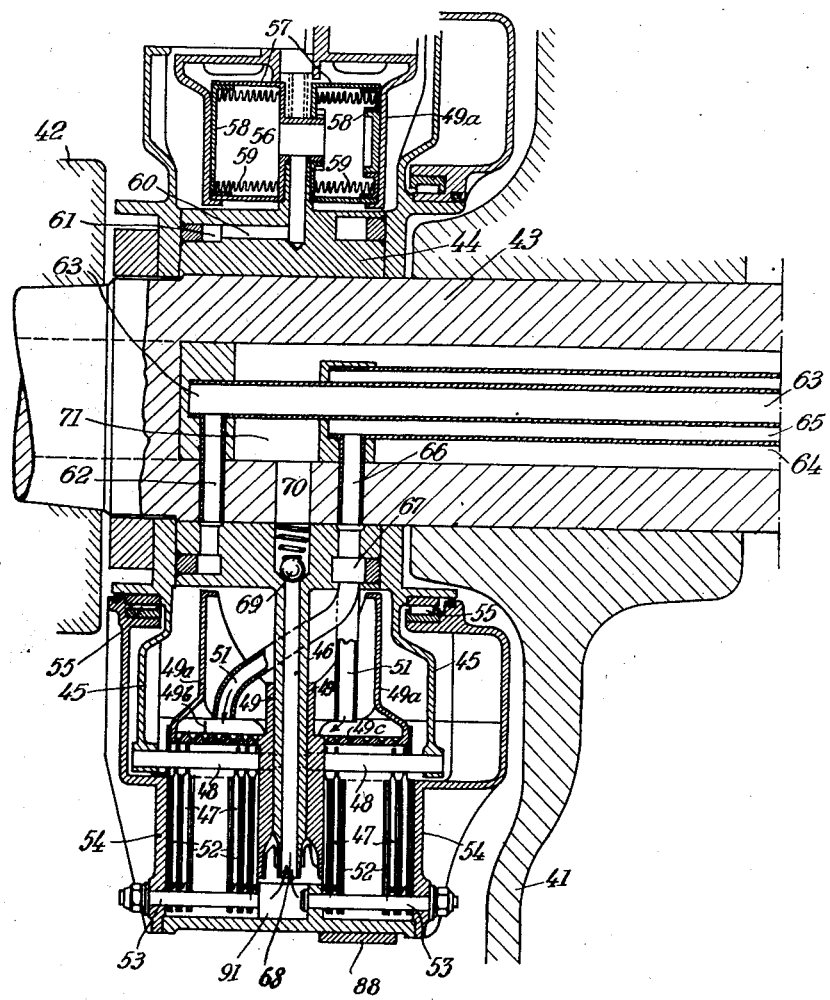
Fig. 1 is an axial section through a brake embodying my invention, in which the section through the upper half is displaced for a certain angle relatively to the section of the lower half. In the upper half parts of the brake are omitted.

In the drawings a brake for a railway-vehicle is illustrated which is arranged between one of the wheels 41 and the exterior axle bearing 42. Near the end portion of the axle 43 a hub 44 is fastened which carries three discs 45, 45 and 46. The two exterior discs 45 serve as carriers for the group of friction discs rotating permanently with the axle. The respective friction discs 47 are suspended on bolts 48 the outer ends of which are positioned in the discs 45, whereas the inner ends are positioned in the intermediate disc 46. In the illustrated embodiment these bolts are distributed over the circumference in two groups each consisting of about six to twelve bolts which are guided in a corresponding number of holes provided at the inner edge of the respective friction discs 47. The bolts 48 serve moreover for the guidance of the pressure plates 49, 49 which serve for the pressing together of the discs when applying the brake. These plates are normally adjacent the intermediate disc 46 and form with the exterior annular discs 49a and the annular transverse walls 49b annular cavities which are open towards the inside and which communicate with the inlet ducts 51, 51 for the cooling medium. The counter-discs 52 consisting in contradistinction with the metallic friction discs 47 of an artificial friction material such as asbestos impregnated with an artificial resin or the like or of sheet metal discs lined with such material are also suspended in groups on bolts 53 which are fastened in a casing 54 enclosing the two groups of the friction discs and their carriers, and furthermore the inlet and outlet ducts, the said casing being for instance by means of needle-bearings 55 mounted on the hub 44, so that the casing may freely rotate about the shaft 43. The casing 54 may be held fast by means of a band-brake or a block-brake 88 acting on the circumference of the casing.

The pressing together of the friction discs through the intermediary of the pressure-plates 49 is effected by air pressure devices 56 of which one is illustrated in the upper part of Fig. 1. Several such devices are distributed over the circumference. Each of said devices consists of two cylinders 57 arranged in pairs, in which cylinders 58 are movable which act immediately on the discs 49a of the pressure plates 49. The packing is effected by means of bellows 59 of thin sheet metal which are soldered on the one side with the piston and on the other side with the bottom of the cylinder 57. The pressure-air is fed to the interior of the cylinder through a bore 60 in the hub 44, which bore communicates with an annular duct 61 from which a radial bore 62 leads to a tube 63 which is surrounded by another tube 64 serving together with a duct 65 for the feed of the cooling medium into the brake. The cooling medium consisting of oil, glycerine, water or preferably of a mixture of water and glycerine flows through a radial bore 66 into an annular duct 67 which communicates with the already mentioned tubes 51, 51. After flowing through the friction discs the cooling medium is collected in the interior of the casing 54 from which the said cooling medium is discharged by means of one or several radial bores 68 provided in the intermediate disc 46, which bores communicate through the intermediary of a spring-actuated valve 69 with a cavity in the hub 44 from which the duct leads through a radial bore 70 of the axle 43 into a bore 71 of the same axle containing the tubes 63 and 64.

The friction discs 47 and 52 are from the beginning adjacent one to another and adjacent the pressure plates 49 which are themselves closely adjacent the intermediate disc 46. For this reason the usual springs by which the friction discs in usual brakes are after the braking brought into the initial spaced position may be dispensed with. The friction discs 52 which in the case represented are of a special friction material may also be substituted by metal discs.

The operation is as follows: Before the operation of the brake the casing 54 is held fast by applying the brake 88 acting on the casing 54 so that the said casing cannot further rotate with the shaft. Subsequently the pressure-air is introduced through the duct 63. The pistons 58 of the pressure devices 56 then move outwards and compress through the intermediary of the pressure-plates 49 the two piles of discs, so that the braking takes place. The brake 88 acting on the casing is in connection with a fast part of the vehicle, so that the turning moment can be taken up, and the said brake has practically no friction work to do, as only the relatively small moment of inertia of the housing, the discs and so forth has to be overcome to bring such elements to a standstill before the real braking operation begins. The brake for the casing may therefore be of small dimensions, but it must be of a strong construction, so that it can take up the circumferential force arising during the real braking operation and can transmit the said force to the carriage. When releasing the brake the pressure air is drawn off and subsequently the brake 88 is released. The interior of the brake casing is always partly filled with the cooling medium. During the braking an automatic flow of the cooling medium in the direction of the arrows of Fig. 1 takes place under the centrifugal action. The cooling medium flows from the tubes 51, 51 into the annular cavities formed by the pressure plates 49 and the discs 49a, and from the said cavities the cooling means flows through openings 49c provided in the walls 49b into the annular spaces which are formed by the exterior sides of the walls 49b and by the inner sides of the piles of friction discs. From the said annular spaces the cooling means flows through gaps provided in friction discs 47 into the annular space 91 forming the interior of the arched wall of the casing 54. From the last-mentioned annular space 91 the cooling medium returns through the ducts 68, 70 and 71, into a radiator from which it is again brought into circulation through the ducts 65, 66 and 67. The circulation may be effected by a circulating pump.

In Figs. 2 and 3 the running wheel 91 of the respective vehicle has an axle 93 which rests in a bearing 92. On the bearing 92 an annular body D provided with reinforcing ribs 94a is fastened, the circumferential portion of which serves for the reception of the pressure devices for the actuation of the auxiliary brake and for the compression of the piles of friction discs. Preferably a plurality of such devices is provided. In the present case six of each kind are provided and equally distributed over the circumference. The section according to Fig. 2 is directed through the middle of a pressure device A for actuating the auxiliary brake, whereas the section according to Fig. 3 is directed through one of the devices B for compressing the piles of friction discs.

Each of the devices A consists substantially of a cylinder 95 bored into the ring D and of a piston 96 moving in the said cylinder. The inner side of the piston communicates through a duct 97 with the source of the pressure-air through the intermediary of ducts which extend only in the fast body D connected with the bearing 92. The piston 96 is forced by a spring 970 back into its initial position, as soon as the pressure of the air is reduced. The piston acts with its outer end on a brake body 98 which is provided with a friction lining 99 and which co-operates with an annular friction surface 100 of the carrier C for the friction discs which are not permanently connected with the axle and which in the following are designated as "loose friction discs." The loose friction discs 111 are again subdivided into two groups which are substantially symmetrical to the plane through the middle of the brake. The discs are suspended in close proximity to each other on bolts 112 which are arranged axially on two stepped annular bodies $C_1$ and $C_2$ forming part of the carrier C and provided with an annular cavity into which the annular projection of the body D engages. The parts $C_1$ and $C_2$ of the carrier of the annular discs have radially extending portions of the shape of annular discs which portions also form the pressure-plates for the piles of friction discs. The said parts $C_1$ and $C_2$ must be displaceable in the axial direction. For this purpose the said parts are guided on their exterior flanges 1120 by bolts 113 projecting from the intermediate part of the carrier C. E is the carrier for the friction discs 114 which permanently rotate with the axle and which are in the following designated as "fast friction discs." In the interior of the carrier E the bearing of the carrier C consists of a number of ball bearings 115 distributed over the circumference, the inner races of said ball bearings being positioned on bolts 116 projecting from the flange portion C3 of the carrier C in an axial direction, whereas the outer races roll on the interior surface of the intermediate portion E1 of the carrier E. E2, E3 are the front or end walls forming together with the intermediate annular portion E1 the casing of the whole brake. The portion E3 is fastened to the wheel 91 by means of bolts 117. The fast friction discs 114 are suspended on bolts 1170 passed through the walls E2, E3 in the direction of the axle. The cavity enclosed by the carrier-casing E is closed by two annular walls 118 which are perforated and connected with the front walls E2, E3 of the casing. The gaps towards the interior are packed with leather guards 119 fastened on the body D.

On the outside the leather guards 119 are connected with a number of annular bodies 120 which at the actuation of the brake by means of the pressure devices B shown in Fig. 3 are displaced outwards in the axial direction to act upon the parts C1, C2 of the carrier C for the loose friction discs, which parts form pressure plates. The annular bodies 120 are provided with projections 121 being of hollow cylindrical shape and being displaceable in corresponding bores of the annular body D to act as pressure pistons. For this purpose they are in the interior provided with bellows 122 of thin sheet metal which are welded on their outer ends to the projections 121 of the annular bodies 120 and with their inner ends to bottom parts 123. In the center of each of the bottom parts a bore 124 is provided which communicates through a duct 125 with the duct 126 of the pressure air. This duct and also the duct 97 mentioned before extend through the fast annular body D to the source of the pressure air. As soon as communication between the source of the pressure air and the duct 126 is established the bellows 122 expand and force their annular members 120 against the carrier-halves C1, C2, so that the piles of friction discs are compressed and the braking is effected. Before this braking operation the brakes 98, 99 acting on the carrier C had been applied by establishing communication between the source of the pressure air and the duct 97 leading to pressure cylinders 95.

The friction discs 111, 114 alternately consisting of bare rings of sheet steel and of rings provided with linings of an artificial friction material are as in the cases described above also in the state of rest in close proximity one to another so that on the one hand the axial length of the brake is a relatively small one and on the other hand a very small stroke of the pressure devices B is sufficient to actuate the brake. To obtain a close proximity of juxtaposed discs, the friction discs are preferably subdivided into a number of sectors which can be made completely plane and which remain plane also under heavy stresses.

In Fig. 3 another construction of the bearing of the carrier C for the loose friction discs is illustrated. Here the carrier C rests with two laterally arranged races 127 on a number of ball bearings 128 which are positioned on bolts 129 projecting from the end walls E2, E3 of the casing towards the inside. The other parts of the brake substantially correspond with the parts of the brake shown in Fig. 2.

The oil or other liquids serving for the lubrication and cooling of the friction discs is introduced through bores 130 in the fast ring D into chambers 131 subdivided by the perforated annular bodies 118 in the interior of the brake casing, and from the said chambers the liquid is forced preferably by a pump through the piles of the friction discs. The cooling means is drawn off by ducts which are also provided in the fast body 99 as in the embodiments already described.

In Fig. 4, 1 is the container for the pressure fluid which serves for actuating the brake, the said fluid being conveyed through the pipe 2 which is connected up to the tube 63 which supplies the fluid to the pressure devices 56 in Fig. 1, by means of which the piles of discs of the brake are compressed. The band brake 88 which acts on the circumference of the casing 54 is attached at one end at 7 to the vehicle frame while the other end is connected by means of a tension member 6 through the intermediary of a spring 8 to a hand lever 5 secured to the plug 4 of a cock 3 which controls the flow of fluid from the pipe 2 to the tube 63. In the position of the hand lever 5 shown in broken lines, the supply of fluid from the container 1 to the brake is interrupted and the brake band 88 is loose. When the hand lever is moved in the direction of the arrow, then the brake band 88 is first drawn tight, thereby rigidly connecting the loose friction disc carrier to the vehicle frame. On the hand lever 5 being turned further in the direction of the arrow, such further movement being permitted by the spring 8 yielding, then communication is established between the pressure fluid container 1 and the pressure devices 56, whereby the piles of discs are compressed and the actual braking operation takes place.

I claim:

1. A brake arrangement for heavy and rapid vehicles especially railway vehicles, having running wheels rotatable with respect to the relatively stationary vehicle body, comprising the following parts: a relatively fast friction disc carrier connected permanently with one of the running wheels of the vehicle, a loose friction disc carrier concentric with said fast carrier and mounted rotatably with respect to the said running wheel and the vehicle body, a group of a plurality of friction discs mounted on said fast friction disc carrier so as to be axially slidable but not rotatable relatively to it, a second group of a plurality of friction discs mounted on said loose friction disc carrier so as to be axially slidable but not rotatable relatively to it, the friction discs of the two groups being arranged alternately and forming an axially compressible pile, means for compressing said pile of friction discs in an axial direction, and means for connecting said loose friction disc carrier with the vehicle body, said connecting means being adapted to act and to be operated independently of the action of said compression means.

2. A brake arrangement for heavy and rapid vehicles especially railway vehicles, having running wheels rotatable with respect to the relatively stationary vehicle body, comprising the following parts: a relatively fast friction disc carrier connected permanently with one of the running wheels of the vehicle, a loose friction disc carrier concentric with said fast carrier and mounted rotatably with respect to the said running wheel and the vehicle body, a group of a plurality of friction discs mounted on said fast friction disc carrier so as to be axially slidable but not rotatable relatively to it, a second group of a plurality of friction discs mounted on said loose friction disc carrier so as to be axially slidable but not rotatable relatively to it, the friction discs of the two groups being arranged alternately and forming an axially compressible pile, hydraulic means for compressing said pile of friction discs in an axial direction, hydraulic means for connecting said loose friction disc carrier with the vehicle body, said connecting means being adapted to act and to be operated independently of the action of said compression means, separate pressure medium conduits for said compression and for said connecting means, and means adapted to set said connecting means in operation prior to the operation of said compression means.

3. A brake arrangement as claimed in claim 1, characterized by the feature that the compression means are arranged within the friction disc carriers.

4. A brake arrangement as claimed in claim 1, characterized by the feature that the connecting means are arranged within the friction disc carriers.

5. A brake arrangement for heavy and rapid vehicles especially railway vehicles, having running wheels rotatable with respect to the relatively stationary vehicle body, comprising the following parts: a relatively fast friction disc carrier connected permanently with one of the running wheels of the vehicle, a loose friction disc carrier concentric with said fast carrier and mounted rotatably with respect to the said running wheel and the vehicle body, a group of a plurality of friction discs mounted on said fast friction disc carrier so as to be axially slidable but not rotatable relatively to it, a second group of a plurality of friction discs mounted on said loose friction disc carrier so as to be axially slidable but not rotatable relatively to it, the friction discs of the two groups being arranged alternately and forming an axially compressible pile, means arranged within the friction disc carriers for compressing said pile of friction discs in an axial direction, and means for rigidly connecting said loose friction disc carrier with the vehicle body, said connecting means being adapted to act and to be operated independently of the action of said compression means being mounted on a stationary ring member connected with the vehicle body and radially projecting into an annular hollow space formed by the inner of the concentrically arranged friction disc carriers.

6. A brake arrangement for heavy and rapid vehicles especially railway vehicles, having running wheels rotatable with respect to the relatively stationary vehicle body, comprising the following parts: a relatively fast friction disc carrier connected permanently with one of the running wheels of the vehicle, a loose friction disc carrier concentric with said fast carrier and mounted rotatably with respect to the said running wheel and the vehicle body, a group of a plurality of friction discs mounted on said fast friction disc carrier so as to be axially slidable but not rotatable relatively to it, a second group of a plurality of friction discs mounted on said loose friction disc carrier so as to be axially slidable but not rotatable relatively to it, the friction discs of the two groups being arranged alternately and forming an axially compressible pile, means arranged within the friction disc carriers for compressing said pile of friction discs in an axial direction, and means for rigidly connecting said loose friction disc carrier with the vehicle body, said connecting means being adapted to act and to be operated independently of the action of said compression means being mounted on a stationary ring member connected with the vehicle body and radially projecting into an annular hollow space formed by the inner of the concentrically arranged friction disc carriers, said ring member being connected with the vehicle body through a hub member which projects from the body in an axial direction into an annular hollow space provided between the running wheel axle and the friction disc carriers.

7. A brake arrangement for heavy and rapid vehicles especially railway vehicles, having running wheels rotatable with respect to the relatively stationary vehicle body, hydraulically actuated compression means and inlet and outlet conduits for said hydraulically actuated compression means, comprising the following parts: a relatively fast friction disc carrier connected permanently with one of the running wheels of the vehicle, a loose friction disc carrier concentric with said fast carrier and mounted rotatably with respect to the said running wheel and the vehicle body, a group of a plurality of friction discs mounted on said fast friction disc carrier so as to be axially slidable but not rotatable relatively to it, a second group of a plurality of friction discs mounted on said loose friction disc carrier so as to be axially slidable but not rotatable relatively to it, the friction discs of the two groups being arranged alternately and forming an axially compressible pile, means arranged within the friction disc carriers for compressing said pile of friction discs in an axial direction, and means for rigidly connecting said loose friction disc carrier with the vehicle body, said connecting means being adapted to act and to be operated independently of the action of said compression means being mounted on a stationary ring member connected with the vehicle body and radially projecting into an annular hollow space formed by the inner of the concentrically arranged friction disc carriers, said ring member being connected with the vehicle body through a hub member which projects from the body in an axial direction into an annular hollow space provided between the running wheel axle and the friction disc carriers, said inlet conduit for the pressure medium being provided in said hub member.

8. A brake arrangement as claimed in claim 7, characterised by the feature that also said outlet conduit is provided in said hub member.

9. A brake arrangement as claimed in claim 6 having an inlet and outlet conduit for a cooling medium, characterised by the feature that at least said inlet conduit is provided in said hub member.

10. A brake arrangement as claimed in claim 1, characterised by the feature that said loose friction disc carrier is arranged inside said fast friction disc carrier, which latter surrounds the former in the shape of a closed casing up to an annular gap near the running wheel axle.

11. A brake arrangement as claimed in claim 1, the two friction disc carriers being arranged one within the other, characterised by the feature that the inner friction disc carrier has a central annular member and two lateral stepped ring members arranged at the sides of said central angular member and connected therewith non-rotatably but axially displaceably, the radial main flange parts of said lateral ring members together with said central annular member forming at least one hollow space for receiving the compression means.

12. A brake arrangement as claimed in claim 7, having a stationary ring member connected to the vehicle body and supporting said compressing means, characterised by two annular discs provided on both sides of said stationary ring member and guided on the same so as to be slidable in an axial direction, said discs being adapted to come into engagement with the main flange parts of said loose friction disc carrier.

13. A brake arrangement as claimed in claim 1, the two friction disc carriers being arranged one within the other, characterised by the feature, that the inner friction disc carrier is supported with respect to the outer one by means of anti-friction rollers which are mounted in groups around the periphery of the central part of the inner friction disc carrier.

14. A brake arrangement as claimed in claim 1, the two friction disc carriers being arranged one within the other and having a stationary hub member, characterised by the feature that the inner friction disc carrier is supported with respect to the outer one by means of anti-friction rollers which are arranged laterally in the vicinity of said member on the casing formed by the outer friction disc carrier.

15. A brake arrangement as claimed in claim 1, having hydraulically actuated compression means and a stationary ring member connected to the vehicle body in a non-rotatable manner, characterised by the feature that the compression means comprise a plurality of bellows arranged inside said stationary ring member and lying opposite one another in pairs, the sides turned away from each other of said bellows being adapted to act upon the friction disc piles, which are likewise arranged in pairs, while the interior of the bellows is connected by a common conduit with the supply pipe for the pressure medium.

16. A brake arrangement for heavy and rapid vehicles especially railway vehicles, having running wheels rotatable with respect to the relatively stationary vehicle body, comprising the following parts: a relatively fast friction disc carrier connected permanently with one of the running wheels of the vehicle, a loose friction disc carrier concentric with said fast carrier and mounted rotatably with respect to the said running wheel and the vehicle body, said two disc carriers being arranged one within the other, a group of a plurality of friction discs mounted on said fast friction disc carrier so as to be axially slidable but not rotatable relatively to it, a second group of a plurality of friction discs mounted on said loose friction disc carrier so as to be axially slidable but not rotatable relatively to it, the friction discs of the two groups being arranged alternately and forming an axially compressible pile, means arranged within the friction disc carriers for compressing said pile of friction discs in an axial direction, and means for connecting said loose friction disc carrier with the vehicle body, said connecting means being adapted to act and to be operated independently of the action of said compression means, the inner friction disc carrier having a central angular member and two lateral stepped ring members arranged at the sides of said central angular member and connected herewith non-rotatably but axially displaceably, the radial main flange parts of said lateral ring members together with said central annular member forming at least one hollow space for receiving the compression means.

17. A brake arrangement as claimed in claim 16, characterised by the feature that the stepped ring members are guided at their outer flanges on a number of axially directed bolts distributed over the periphery, on which bolts at the same time the friction discs of the one group are arranged.

18. A brake arrangement as claimed in claim 16, having hydraulically operated compression means and cooling medium circulation means, characterised by the feature that the central disc member is provided with passages.

19. A brake arrangement as claimed in claim 1, characterised by the feature that the means for rigidly connecting the loose friction disc carrier with the vehicle body comprise a plurality of radially directed pressure devices distributed over the periphery which can actuate at least one brake co-acting with the inner peripheral surface of said loose friction disc carrier.

20. A multiple disc brake for power driven vehicles comprising: a relatively stationary part, a shaft, a set of brake discs rigidly mounted on said shaft, a second set of brake discs alternating with the discs of said first set and rotatable relatively to said stationary part and to said shaft, means to compress said sets of discs, a loose carrier for said second set of discs normally rotating together with said shaft, and an auxiliary friction brake in direct operative connection with said loose carrier and adapted to stop the rotation of said second set of discs.

21. A multiple disc brake for power driven vehicles comprising: a stationary part in permanent connection with the vehicle body, a shaft, a set of thin sheet metal brake discs fixed on said shaft, a second set of thin sheet metal brake discs alternating with the discs of said first set and rotatable relatively to said stationary part, means to compress said sets of discs, a casing normally rotating together with said shaft and carrying one of said sets of discs fixed thereto, an auxiliary friction brake in immediate operative connection to said casing and adapted to stop it against rotation, and means to operate said auxiliary brake prior to the actuation of said compressing means.

22. In a multiple disc brake as claimed in claim 20, the disc carrier of which comprising a hub member, two plates radially projecting from the ends of said hub member, said plates being connected to a common intermediate plate through the intermediary of circumferentially distributed bolts on which the brake discs are suspended.

23. A multiple disc brake as claimed in claim 20, the disc carrier of which having the form of a casing enclosing also said first named set of brake discs, said auxiliary brake and said disc compressing means being positioned within an annular body extending from said shaft radially into the centre of said casing and being connected to said stationary part.

24. A multiple disc brake as claimed in claim 20, the disc carrier of which being rotatably mounted within a casing carrying the first named set of brake discs by means of antifriction rollers being in rolling engagement with the inside of said casing.

25. A multiple disc brake as claimed in claim 20, the disc carrier of which being rotatably mounted within a casing carrying the first named set of brake discs by means of ball bearings mounted on studs axially projecting from the inside of said casing, the outer rings of said bearings being in rolling engagement with rolling races provided on said disc carrier.

26. A brake arrangement for heavy and rapid vehicles, especially railway vehicles, having two vehicle parts adapted to perform a rotating movement relatively to one another, comprising the following parts: a relatively fast friction disc carrier connected permanently with one of said vehicle parts, a loose friction disc carrier mounted rotatably with respect to both said vehicle parts, a group of friction discs mounted on said fast friction disc carrier, a second group of friction discs mounted on said loose friction disc carrier, the friction discs of the two groups being arranged alternately and forming an axially compressible pile, means arranged within said friction disc carriers for compressing said pile in an axial direction, and means for connecting said loose friction disc carrier to the other one of said vehicle parts, said connecting means being adapted to act and to be operated independently of the action of said compressing means.

27. A brake arrangement for heavy and rapid vehicles, especially railway vehicles, having two vehicle parts adapted to perform a rotating movement relatively to one another, comprising the following parts: a relatively fast friction disc carrier connected permanently with one of said vehicle parts, a loose friction disc carrier mounted rotatably with respect to both said vehicle parts, a group of friction discs mounted on said fast friction disc carrier, a second group of friction discs mounted on said loose friction disc carrier, the friction discs of the two groups being arranged alternately and forming an axially compressible pile, means for compressing said pile in an axial direction, and means for connecting said loose friction disc carrier to the other one of said vehicle parts, said connecting means being adapted to act and to be operated independently of the action of said compressing means.

28. A brake arrangement for heavy and rapid vehicles, especially railway vehicles, having two vehicle parts adapted to perform a rotating movement relatively to one another, comprising the following parts: a relatively fast friction disc carrier connected permanently with one of said vehicle parts, a loose friction disc carrier mounted rotatably with respect to both said vehicle parts, a group of friction discs mounted on said fast friction disc carrier, a second group of friction discs, mounted on said loose friction discs carrier, the friction discs of the two groups being arranged alternately and forming an axially compressible pile, means for compressing said pile in an axial direction, means for connecting said loose friction disc carrier to the other one of said vehicle parts, said connecting means being adapted to act and to be operated independently of the action of said compressing means, and means adapted to set said connecting means in operation prior to the operation of said compressing means.

HANS KATTWINKEL.